United States Patent [19]

Dosoudil

[11] 4,220,536

[45] Sep. 2, 1980

[54] APPARATUS FOR FILTERING LIQUIDS

[75] Inventor: Martin Dosoudil, Alkmaar, Netherlands

[73] Assignee: Amafilter BV, Alkmaar, Netherlands

[21] Appl. No.: 34,033

[22] Filed: Apr. 27, 1979

[51] Int. Cl.² .............................................. B01D 33/02
[52] U.S. Cl. .................................... 210/325; 210/327
[58] Field of Search ............... 210/325, 327, 331, 332, 210/334, 341, 402, 403, 404, 408, 358

[56] References Cited

U.S. PATENT DOCUMENTS

| | | | |
|---|---|---|---|
| 2,406,065 | 8/1946 | Dietman et al. | 210/408 |
| 2,781,133 | 2/1957 | Thompson | 210/403 |
| 3,255,888 | 6/1966 | Balfour | 210/404 |
| 3,363,774 | 1/1968 | Luthi | 210/404 |
| 3,485,378 | 12/1969 | Rejel | 210/403 |

*Primary Examiner*—Theodore A. Granger

*Attorney, Agent, or Firm*—Pollock, Vande Sande and Priddy

[57] ABSTRACT

An apparatus for filtering liquids comprises a substantially cylindrical shaped and horizontally placed filter-casing in which at least one supporting member is journaled for rotation substantially about the axis of the casing. The supporting member is provided with a number of hollow rotating shafts, evenly spaced around its axis of rotation, and each shaft carries at least one disc-shaped filter-element. The filtrate discharge from the disc-shaped filter elements passes through the hollow rotating shafts to an outlet-conduit mounted stationary with respect to the supporting member. A conveying trough provided with a conveying screw is arranged substantially in alignment with the axis of rotation of the supporting member to transport the filter-cake dislodged from the filter-elements and received by the trough out of the filter-casing.

14 Claims, 3 Drawing Figures

APPARATUS FOR FILTERING LIQUIDS

The present invention relates to an apparatus for filtering liquids, comprising a substantially cylindrical shaped and horizontally placed filter casing in which, substantially perpendicular to the axis of the casing, a number of disc-shaped filter elements is mounted.

When operating this known apparatus, a filter cake is built up on the filter elements and its thickness increases during the filtration, so that it is necessary from time to time to discontinue temporarily the operation of the apparatus in order to remove the filter cake, which has reached a predetermined thickness, from the filter elements. It is an object of the present invention to provide an apparatus by which liquids may be continuously filtered.

According to the invention an apparatus is provided for filtering liquids and in which at least one supporting member is journaled in the filter casing for rotation relative thereto and substantially about the axis of the casing, which supporting member is provided with a number of rotating shafts, evenly spaced around its axis of rotation and each rotating shaft carrying at least one filter element of which the filtrate discharge passes through the rotating shaft to an outlet conduit, mounted stationary with respect to the supporting member, while a conveying trough with a conveying screw is arranged substantially in alignment with the axis of rotation of the supporting member to transport the filter cake dislodged from the filter elements and received by the trough, out of the filter casing. When operating the invented apparatus, the liquid to be clarified or filtered is continuously introduced under a pressure of for instance 6 bar. into the filter casing, and the supporting member is continuously rotated, thereby moving the rotating shafts with the filter elements around and through the liquid to be filtered. During the immersion of a filter element in the liquid to be filtered, this liquid is pressed through the filter element arriving at the inside of the filter element as filtrate and deposit the solids to be removed from the liquid in the form of the filter cake upon the outside of the filter element.

When the filter element by the continued rotation of the supporting member has left the liquid bath in the filter casing, the filter cake is to be dislodged from the filter element. Dislodging the filter cake from the filter elements may be carried out in various manners.

According to a feature of the invented apparatus, a scraping member is extending substantially radially from the rotating shaft on both sides of each filter element and cooperating with a blocking member which, when brought into its operative position, prevents the scraping member from rotating with the adjacent filter elements. When not rotating with the adjacent filter elements, the scraping member will scrape the filter cake from these elements and the filter cake may fall down into the conveying trough to be carried off outside the filter casing. When not in its operative position, the blocking member will allow the scraping members to rotate with the adjacent filter elements and on which then the filter cake may be build up.

The rotating shafts may be driven by various means. According to a feature of the invented apparatus, each rotating shaft individually may be rotated by a motor mounted stationary with respect to the supporting member. By driving the rotating shafts individually, it will be possible to rotate the filter elements with respect to the supporting member, dependent upon their position relative to the liquid bath in the filter casing. Advantageously the supporting member, according to a feature of the invented apparatus, is mounted on a pipe-shaped central driving shaft extending out of the casing to be provided there with a drive mechanism.

According to a further feature of the invented apparatus, the filtrate outlets of the rotating shafts of the filter elements each are connected via valve means to the inside of the pipe-shaped central driving shaft and through which the filtrate may be led out of the filter casing. Like the drive motors, the valve means of the filtrate discharges of the rotating shafts of the filter elements may be controlled dependent upon the position of the rotating shaft with respect to the liquid bath in the casing and thereby the pressure differentials between the inside and the outside of the filter elements be regulated.

By applying individual drive motors and individual valve means which may be separately controlled, the most efficient operation of the apparatus may be achieved. As the valve means and/or drive motors of the rotating shafts substantially are controlled dependent upon the position with respect to the filter casing, these valve means and/or drive motors may be controlled advantageously by controlling means coupled with the driving shaft of the supporting member.

Further features of the invented apparatus will become apparent as the description proceeds when taken in connection with the accompanying drawing, in which, FIG. 1 is a vertical sectional view of example of the invented apparatus.

Figure 1:
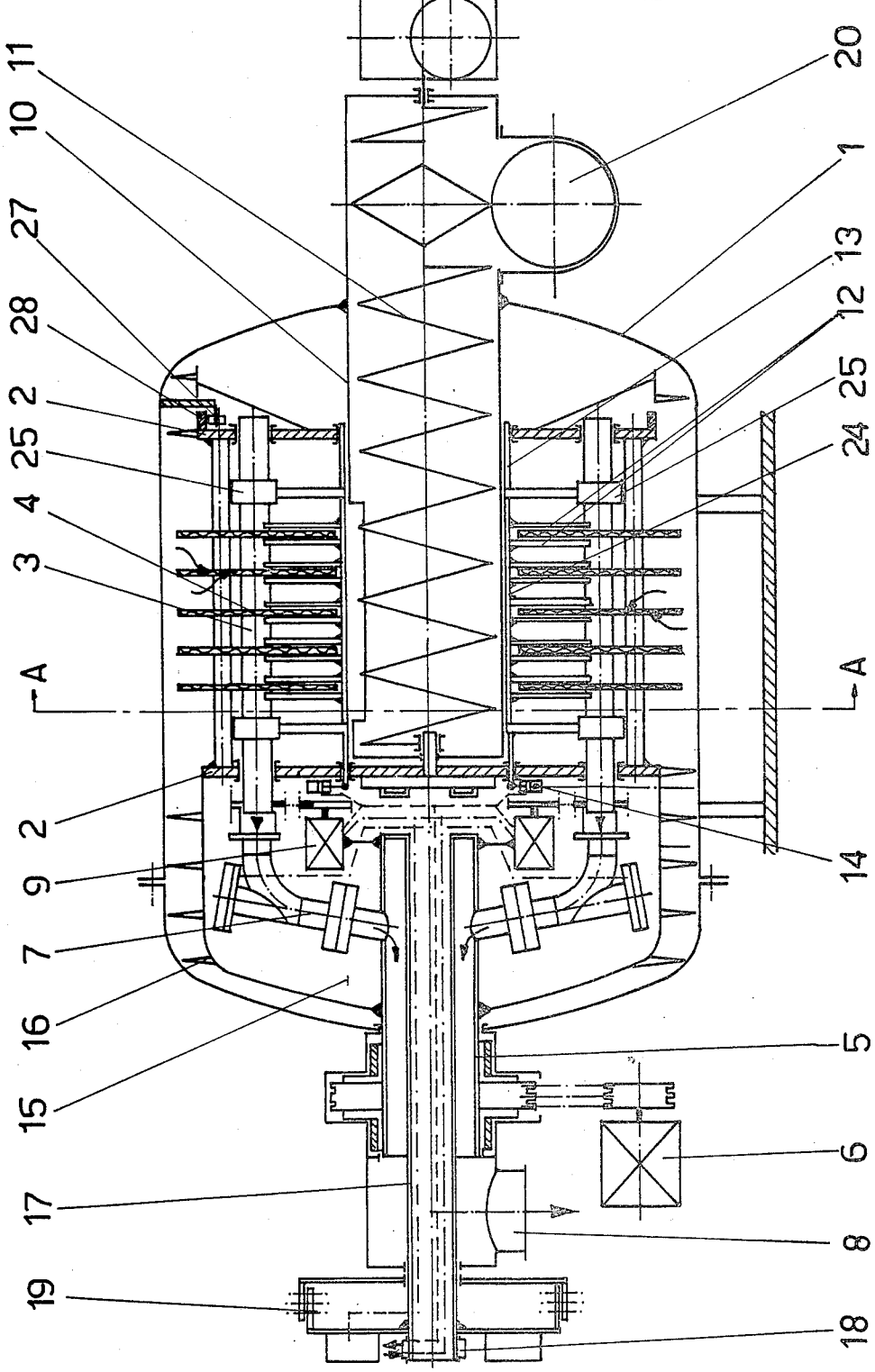
Figure 2:
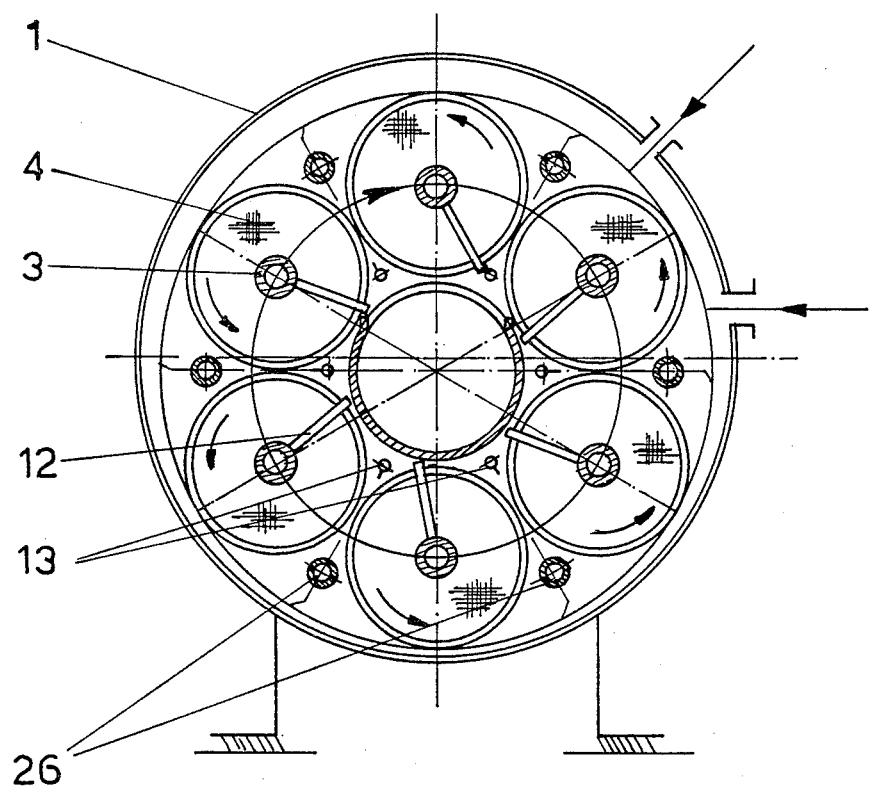
FIG. 2 is a sectional view taken along the line A—A of FIG. 1.

As shown in FIG. 1 and FIG. 2, the apparatus comprises a cylindrical and horizontally placed filter casing (1), in which, coaxial with the axis of the casing, a supporting member (2) is mounted which, spaced around its axis of rotation, is provided with a number of hollow rotating shafts (3), each carrying a number of disc shaped filter elements (4). The supporting member (2) is mounted on the pipe-shaped central driving shaft (5) which is journaled in the filter casing to rotate about the axis of the casing. Outside the casing the pipe shaped central driving shaft (5) is coupled with a drive motor (6) by means of which the supporting member (2) may be rotated within the filter casing (1).

The filtrate discharges of the filter elements (4) pass through the hollow rotating shafts (3) to the supporting member (2) to be connected there via the pneumatic actuatable valves (7) to the inside of the pipe shaped central driving shaft (5) and through which the filtrate is passed to the end outlet (8) of the apparatus.

The rotating shafts (3) of the filter elements (4) each are provided with a hydraulic motor (9) mounted to the supporting member (2) and which, like the valves (7), may rotate with the supporting member (2). Also extending coaxially with the axis of the casing and in line with the central driving shaft (5), a conveying trough (10) with conveying screw (11) is arranged. The trough (10) is open at the upper side to receive the filter cake dislodged from the filter elements by means of the scraping members (12).

The scraping members (12) extend substantially radially from the rotating shafts (3) and are mounted outside the filter elements on a frame (24) supported by the rotating shafts (3) by means of hubs (25) which, against frictional torque, may be rotated relative to the rotating shafts (3). Outside the filter elements, the scraping members (12) cooperate via the frame (24) with blocking members (13) which, when brought into operative position, prevent the scraping members (12) from rotating with the filter elements (4) to cause the filter cake to be scraped from the adjacent filter elements and, to fall down into the conveying trough (10). By means of the hydraulic cylinders (14), the blocking members (13) may be brought into and out of the operative position. The valves (7), the hydraulic motors (9) and the hydraulic cylinders (14) for actuating the blocking members, are enclosed in a housing (15) mounted to the supporting member and which housing, at its periphery is provided with helical blades (16).

The housing (15) communicates with the central pipe (17) extending through the central driving shaft (5), and which may communicate outside the filter casing with the surroundings.

The central pipe (17), which is secured to the central driving shaft (5), is at the end outside the filter casing (1) provided with a hydraulic connection (18), through which the pressurized fluid for the hydraulic motors (9) may be supplied from a pump located outside the apparatus. Also at this end portion of the central pipe (17) are arranged the control means (19) for the motors (9), the valves (7) and the hydraulic cylinders (14) enclosed in the housing (15).

Figure 3:
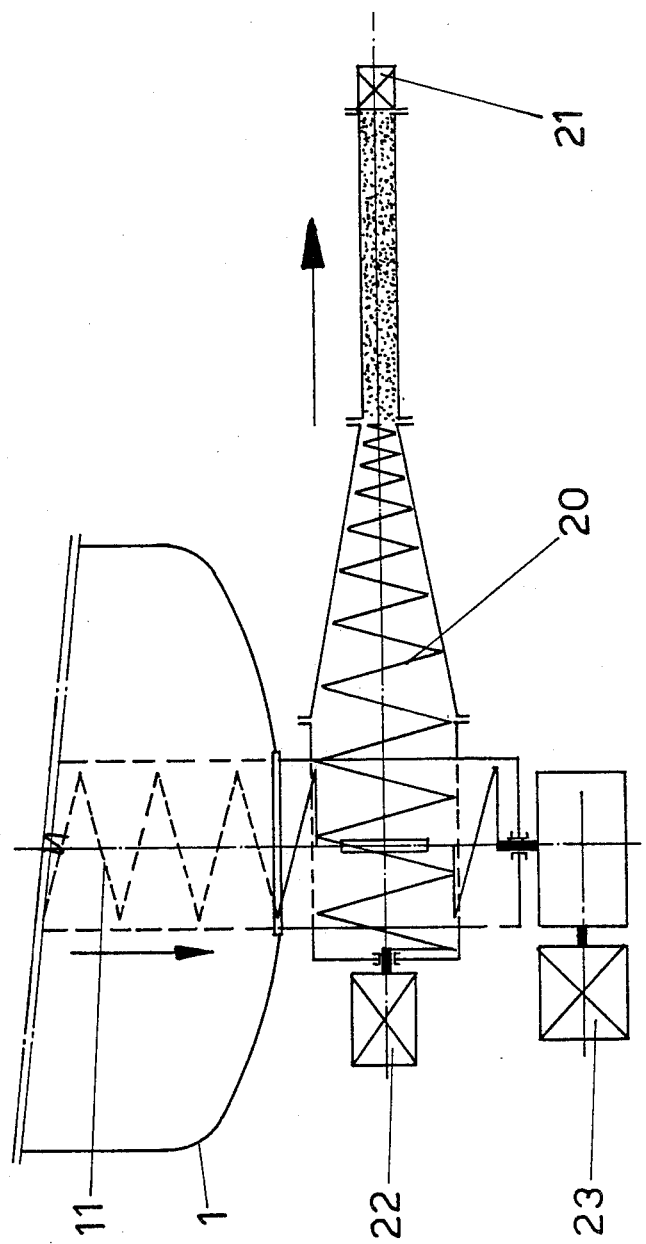
FIG. 3 is a top view of the arrangement of the conveying means for the dislodged filter cake.

As is shown in FIG. 1, the power and control lines pass from the hydraulic connection (18) and the control means (19) through the central pipe (17) to the housing (15). As is shown in FIG. 1 and in FIG. 3, the screw conveyor (11) connects outside the casing (1) to a second screw conveyor (20) which, towards its outlet, is provided with a conically narrowing portion, while its outlet is provided with a valve member (21). Both screws may be driven by motors (22) and (23). As is shown in FIG. 1 and FIG. 2, the supporting member (2) consists of two spaced portions, connected to each other by beams or pipes (26). On one side the supporting member is carried by its driving shaft (5) and on its other side by the rollers (27) mounted above the liquid level to the filter casing and cooperating with the rail (28) secured to the supporting member.

I claim:

1. An apparatus for filtering liquids, comprising a substantially cylindrical shaped and horizontally disposed filter casing in which, substantially perpendicular to the axis of the casing, a number of disc shaped filter elements is mounted, characterized, in that at least one supporting member is journaled in the casing for rotation relative thereto and substantially about the axis of the casing, said supporting member being provided with a number of hollow rotating shafts evenly spaced around its axis of rotation, each of said hollow rotating shafts carrying at least one filter element arranged to direct the filtrate discharge from said filter element through its associated hollow rotating shaft to an outlet conduit mounted stationary with respect to said supporting member, and a conveying trough having a conveying screw arranged substantially in alignment with the axis of rotation of said supporting member for transporting the filter cake dislodged from the filter elements and received by the trough out of the filter casing.

2. An apparatus as claimed in claim 1, characterized, in that on both sides of each filter element a scraping member extends substantially radially from the rotating shaft, and a movable blocking member which, when brought into its operative position, prevents the scraping members from rotating with the adjacent filter elements.

3. An apparatus as claimed in claim 2, characterized, in that hydraulic control means are provided for controlling the position of the blocking member.

4. An apparatus as claimed in claim 3, characterized in that the rotating shafts of the filter elements are each rotated individually by a motor mounted stationary with respect to the supporting member.

5. An apparatus as claimed in claim 4, characterized, in that the rotating shafts of the filter elements are rotated by hydraulic motors.

6. An apparatus as claimed in claim 4 characterized in that the supporting member is carried by a pipe shaped central driving shaft extending out of the casing, and a drive mechanism connected to said central driving shaft on the exterior of said casing.

7. An apparatus as claimed in claim 6 characterized, in that filtrate outlets of the rotating shafts of the filter elements each are connected via valve means to the inside of the pipe shaped central driving shaft.

8. An apparatus as claimed in claim 7 characterized in that pneumatic control means are provided for controlling the valve means.

9. An apparatus as claimed in claim 7 characterized in that the valve means, the driving motors of the rotating shafts of the filter elements and the control means of the blocking members are enclosed in a housing mounted to the supporting member.

10. An apparatus as claimed in claim 9, characterized, in that the housing communicates with the inside of a central inner pipe coaxially passing through the pipe shaped central driving shaft.

11. An apparatus as claimed in claim 10, characterized, in that the control lines for the motors, valve means and control means inside the housing pass through said central inner pipe.

12. An apparatus as claimed in claim 10 or 11 characterized, in that one or more control means and/or power connections are arranged outside the filter casing at one end of the central inner pipe.

13. An apparatus as claimed in one of 1 through 11 characterized in that the supporting member is provided at its periphery with at least one helical blade.

14. An apparatus as claimed in one of claims 1 through 11 characterized in that said conveying trough connects outside the filter casing to a second conveying trough having a second conveying screw, said second conveying trough extending perpendicular to the first trough and being provided at one end thereof with a conically narrowing portion forming the outlet from said second trough.

* * * * *

UNITED STATES PATENT AND TRADEMARK OFFICE
CERTIFICATE OF CORRECTION

PATENT NO. : 4,220,536
DATED : September 2, 1980
INVENTOR(S) : Martin Dosoudil

It is certified that error appears in the above—identified patent and that said Letters Patent is hereby corrected as shown below:

In the heading:

insert the priority information to read as follows:

-- April 28, 1978    Netherlands    7804578 --.

Signed and Sealed this

Twenty-third Day of December 1980

[SEAL]

Attest:

SIDNEY A. DIAMOND

Attesting Officer    Commissioner of Patents and Trademarks